Oct. 27, 1970  B. DIETL  3,535,963
CLAMPING DEVICE
Filed March 29, 1968  6 Sheets-Sheet 1

Inventor:
Bruno Dietl,
By Ernst A. Marmorek,
His Attorney.

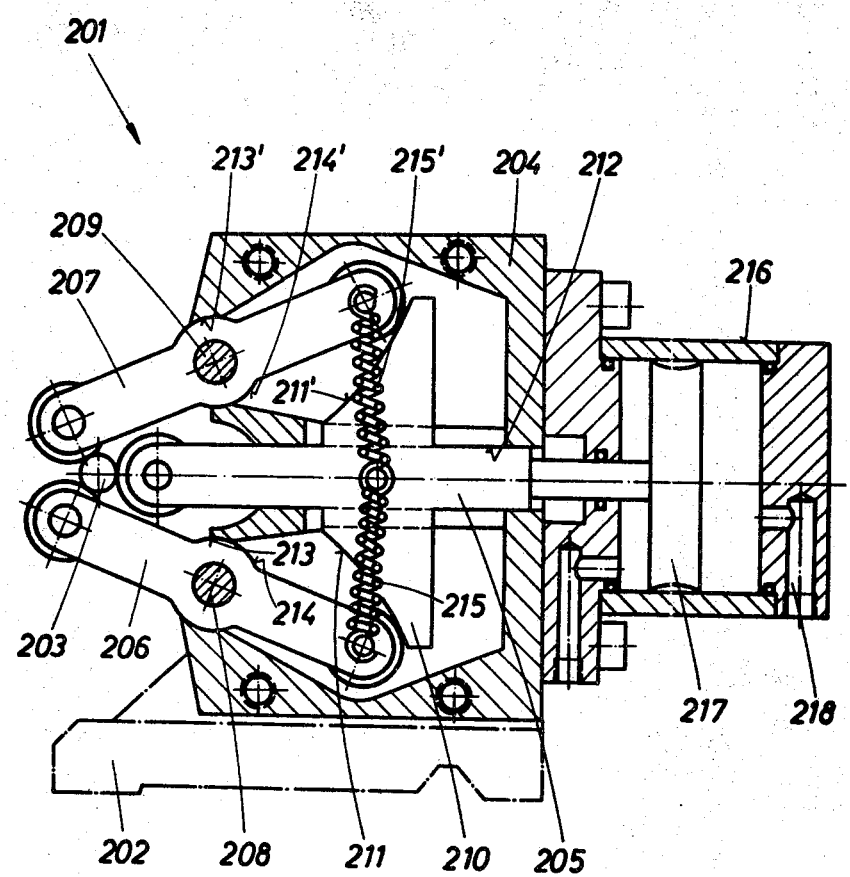

Oct. 27, 1970  B. DIETL  3,535,963
CLAMPING DEVICE

Filed March 29, 1968  6 Sheets-Sheet 3

Inventor:
Bruno Dietl,
By His Attorney.

Oct. 27, 1970   B. DIETL   3,535,963
CLAMPING DEVICE
Filed March 29, 1968   6 Sheets-Sheet 4

Inventor:
Bruno Dietl,
By *[signature]*
His Attorney

Oct. 27, 1970     B. DIETL     3,535,963

CLAMPING DEVICE

Filed March 29, 1968     6 Sheets-Sheet 5

Inventor:
Bruno Dietl,
By *Ernest A. Marmorek,*
His Attorney.

Oct. 27, 1970  B. DIETL  3,535,963
CLAMPING DEVICE
Filed March 29, 1968  6 Sheets-Sheet 6

Bruno Dietl,
Inventor
By Ernest F. Marmorek,
His Attorney

United States Patent Office 3,535,963
Patented Oct. 27, 1970

3,535,963
CLAMPING DEVICE
Bruno Dietl, Burgerweg 64, Gerbertshaus, Germany
Filed Mar. 29, 1968, Ser. No. 717,138
Claims priority, application Germany, June 6, 1967,
D 53,270; Dec. 7, 1967, D 54,790
Int. Cl. B23b 25/00
U.S. Cl. 82—38                                                6 Claims

ABSTRACT OF THE DISCLOSURE

A clamping device clamps workpieces to turning machines and has a plurality of jaws and means for simultaneously moving the jaws into and out of engagement with the workpiece.

---

The present invention relates to an apparatus known as chuck or steady rest for clamping and/or holding a workpiece on a turning machine that comprises preferably three jaw elements acting on the workpiece and being uniformly spaced therearound. These elements are actuated through a lever system, manually or by servo-force, for example by a piston actuated by a pressure fluid, the system preferably including means for amplifying the clamping force applied to the jaw elements.

It is among the principal objects of the invention to provide a chuck of the aforesaid type whose function and operation are improved.

Various steady rest mechanisms are known for clamping very slender workpieces on turning machines. In the conventional arrangements one or two jaws are stationary in a casing, a third holding element being shifted through a lever system manually or by a piston actuated by a pressure fluid. Two jaws must therefore be adjusted to suit the workpiece prior to the clamping operation. Arrangements of this kind are not suitable for noncircular workpieces because usually two of the jaws do not yield. In spite of the large manufacturing costs of the lever system, of the jaws, of the actuating devices and the size of the aforesaid mechanisms and parts, the conventional clamping systems have considerable deficiencies, particularly encountered for handling noncircular workpieces.

It is accordingly another object of the invention to provide a device for clamping and/or holding a workpiece on a turning machine which device overcomes the aforedescribed deficiencies, which is structurally simple and which permits reliable clamping of noncircular workpieces, because all jaws are yieldably supported.

Further objects and advantages of the invention will be set forth in part in the following specification and in part will be obvious therefrom without being specifically referred to, the same being realized and attained as pointed out in the claims hereof.

According to an embodiment of the invention, generally speaking, a devie of the steady rest kind, for clamping and/or steadying a workpiece in a turning machine, has a plurality of for instance three uniformly distributed jaw elements acting on the workpiece which elements are operated manually by a servomotor through a lever system; the jaw elements acting on the workpiece are operatively connected by one or more shifting elements and are so guided that the portion of the holding elements engaging the workpiece is movable substantially radially of the workpiece according to the adjusting movement of the lever system and/or of the workpiece.

It is of advantage to support the jaws turnably or shiftably and to provide them with rotatable rollers or with slides or the like which may be spherical and/or bevelled, for engagement with the workpiece. These antifriction means may be made of synthetic material.

In a preferred modification of a chuck or steady rest according to the invention, generally speaking, the chuck has three jaw elements acting on the workpiece, one of the jaw elements is generally in the form of a rod axially movable toward and from the workpiece whereas the other two elements are in the form of levers which are arranged symmetrically with respect to the longitudinal axis of the first element. These levers have free ends that abut against camlike portions of the rodlike first element which portions extend laterally of the longitudinal axis of the first element. These portions preferably form a prism having curved surfaces or plane surfaces which are preferably inclined 45° in the direction of movement of the first element toward and from the workpiece. These surfaces are engaged by the free ends of the levers for transmitting the movement caused by a lever system acting on the first element at least in the direction effecting clamping.

In the foregoing modification, springs may be provided for returning the levers to workpiece releasing position. These springs may abut against the levers and a housing of the chuck. For reducing friction rotatable rollers, slides or the like may be provided on the free ends of the levers which slides or the like may be made of synthetic material and have spherical or bevelled surfaces. It is advisable to provide in the housing of the chuck bearing surfaces mating with bearing surfaces on the angle levers for positioning and guiding the movement of the angle levers. These bearing surfaces are curved and individually concentric of the fulcrums of the angle levers.

In a modification of the invention, the camlike portions of an oblong first element are replaced by links that are pivotably connected to the first element and to the free ends of the levers.

In another modification three jaw elements are oblong and movable towards and from the workpiece in the direction of the longitudinal axes of the jaw elements. The latter are in pairs movably connected by means of a lever and of a link pivotably connected to said lever.

In an advantageous embodiment a shifting member is provided in the form of an annular disc and supported rotatably around its center. Jaw elements are movably connected to said shifting member for actuation thereby and an actuating means is connected to the shifting member for movement thereof. The jaw elements may be slidable in recesses or grooves in a housing containing the annular shifting member and may be operatively connected to the latter by pins connected to the jaw elements movable in suitable slots in the shifting member. The jaw members may be in the form of two-armed levers fulcrumed to the chuck housing and actuated by a pin connected to the shifting member and extending into a suitable aperture in the end of one of the arms of the two-armed lever.

In a modification of the chuck provided with an annular shifting member the latter may be provided with a gear rim cooperating with pinions rotatably supported in the chuck housing and cooperating with a tooth rack provided on the jaw elements. In this case the jaw elements are slidable in suitable guide recesses in the chuck housing and movable towards and from the workpiece radially with respect thereto. In lieu of the pinions, the jaw elements may be formed as two-armed levers having a tooth segment on one arm meshing with the gear rim.

For actuating the shifting means of a chuck for clamping and releasing a workpiece, a lever system, or other movement, there are provided transmitting means, for example wedge means, which are actuated by a servomotor, for example a piston movable in a cylinder placed in the chuck housing. The lever system may also be connected, for example, to a part guided in the chuck housing for axial movement and provided with an internally threaded bore receiving a threaded spindle which may be manually rotated.

It has been found that, particularly when machining workpieces of large diameter, the required clamping pressure can be produced only by using an operating fluid of very high pressure.

It is therefore a further object of the invention to provide a device for clamping and/or holding a workpiece in a turning machine whereby very great forces for clamping the workpiece can be applied in a simple manner, and reliable holding of particularly large workpieces is effected.

This generally speaking, is achieved by providing the chuck with means amplifying the clamping force and acting on one of the jaw elements, particularly on an oblong jaw element which is axially movable toward and from the workpiece. The mechanism for amplifying the force acting on the oblong jaw element may comprise a movably arranged wedge operatively connected to a piston actuated by a pressure fluid, the wedge having a slanted surface abutted by one end of said oblong jaw element. Springs may be interposed between the oblong element and the chuck housing for assuring engagement of the oblong element with the wedge surface at all times.

In order to amplify the force acting on the workpiece in different diameter ranges of the latter, the aforesaid wedge with a cylinder containing said piston is preferably tiltably connected to the housing of the chuck, for affording tilting of the wedge to positions which are most suitable for the individual diameter ranges of the workpiece, means being provided for fixing the piston-wedge assembly in the desired positions.

For tiltably supporting the wedge a guide member may be rockably connected to the housing of the chuck and provided with a guide groove wherein the wedge is guided for sliding movement. This guide member or adjacent portions of the chuck housing may be provided with recesses or bores for receiving a pin connecting the guide member with the chuck housing for fixing the guide member in predetermined positions corresponding to different diameter ranges of the workpiece.

The oblong element may be connected to the wedge, for example, by pivotably connecting a connecting element to the oblong element and slidably guiding the connecting element in the wedge.

By using an additional device for increasing the clamping force, a conventional pressure producing means suffices for obtaining almost any force required for holding a workpiece. As the inclination of the wedge and its placement to suit different diameter ranges of the workpiece can be adjusted it is possible so to augment the force applied to the oblong element that large workpieces can always reliably be held by the jaw elements. The displacement of the jaw elements is reduced by the proposed amplifying means; however, by rocking the wedge or shifting it parallel with itself this effect can be substantially compensated.

At a sudden impact, the clamping or holding of the workpiece is not impaired because displacement of the jaw elements, particularly of the oblong jaw element acting on the wedge, is correspondingly changed so that compressed air can be used for operating a piston which actuates the chuck.

The novel features which are considered characteristic of the invention are set forth with particularity in the appended claims. The invention itself, however, and additional objects and advantages thereof will best be understood from the following description of embodiments thereof when read in connection with the accompanying drawings, wherein:

FIG. 1a is a schematic longitudinal sectional view of a modified chuck according to the invention;

Figure 1:
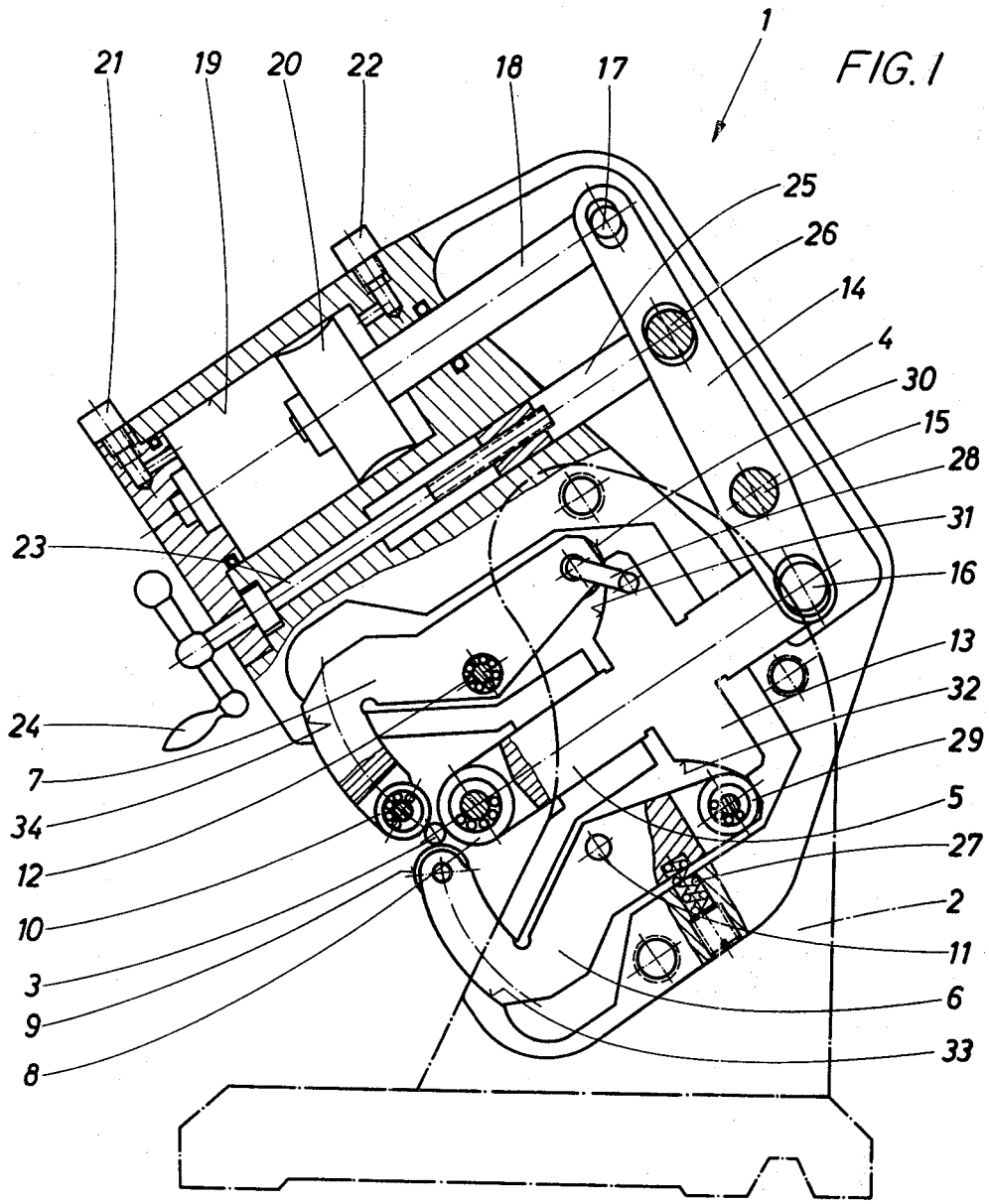
FIG. 1 is a schematic view of a housing opened to show the inside thereof, with parts broken away, of a chuck according to the invention.

In carrying the invention into effect in the embodiments which have been selected for illustration in the accompanying drawings and for description in this specification, and referring more particularly to FIG. 1 of the drawings, a clamping device 1 or chuck is provided for mounting and/or holding a, preferably rotating, workpiece 3 in a turning machine, more particularly in a lathe, not shown. The device 1 comprises a housing 4 that is provided with a support 2 shown in broken lines: Operatively connected jaw elements 5, 6 and 7 acting on the workpiece 3, and actuating elements connected to the elements 5, 6 and 7 for operating the latter, are placed in the housing 4. The element 5 is oblong and movable in the direction of its longitudinal axis towards and from the workpiece 3 and is provided with a camlike portion 13 acting on angle levers rockable on pins 11 and 12 and forming the jaw elements 6 and 7. The ends of the elements 5, 6 and 7, which ends act on the workpiece 3, are provided with rollers 8, 9 and 10, respectively, for facilitating rotation of the workpiece.

The camlike portion 13 is in the form of a prism having surfaces 31 and 32 that engage end portions of the elements 6 and 7 for actuation of the elements 6 and 7 and operative connection of the elements 5, 6 and 7. In order to reduce friction, rollers 29 and 30 are provided on the ends of the angle levers 6 and 7 which ends are opposite the cam surfaces 31 and 32.

In the embodiment of the invention illustrated in FIG. 1 a piston 20 slidable in a cylinder 19 and actuated by a pressure fluid admitted or released through conduits 21 or 22 is shown as a means for actuating the elements 5, 6 and 7. A piston rod 18 extending from the piston 20 is pivotably connected at 17 to one end of a two-armed lever 14 swingable on a pin 15 which is made fast on the inside of the housing 4. The second end of the lever 14 is pivotably connected at 16 to the element 5 which is moved towards or from the workpiece 3 depending on the movement of the lever 14.

Instead of using the piston 20 for moving the jaws 5, 6 and 7, there may be used a spindle 23 provided with a hand wheel 24 and having a threaded end portion cooperating with an internally threaded portion of an element 25; the spindle 23 and its parts are used for rocking the lever 14. The element 25 is axially slidable in a bore of the housing 4 and has an end pivoted at 26 to the lever 14. Manipulation of the hand wheel 24 causes movement of the lever 14 and shifting of the jaw elements 5, 6 and 7.

If it is desired to clamp a workpiece 3, for example a shaft, on a turning machine, the chuck 1 connected to the support 2 must be placed in a suitable location on the machine. The jaw elements 5, 6 and 7 are then roughly aligned with the workpiece. After placement of the workpiece between the elements 5, 6 and 7, a pressure fluid is admitted through the conduit 21 to one side of the piston 20, if actuation of the chuck by servo-power is desired; if manual operation is desired, the spindle 23 is rotated by rotation of the hand wheel 24. This causes rocking of the lever 14 around the pin 15 and movement of the element 5 towards the workpiece 3. If manual operation is selected, the pin 17 is preferably removed.

At the aforedescribed shifting operation, the rollers 29 and 30 roll on the surfaces 32 and 31, respectively, in an outward direction whereby the rollers 9 and 10 are pressed against the workpiece 3 and the latter is held according to the applied clamping force and supported at three locations.

The surfaces 31 and 32 of the portion 13 of the element 5 are so curved that when clamping workpieces of different diameters, the points of contact between the workpieces and the jaws are on a straight line originating at the center of the workpieces. Thereby the angle levers forming the jaws act at equal angles on the workpieces of different diameters and equally good clamping of the workpieces of different diameters is obtained. The curvature of the surfaces 31 and 32 may be defined empirically or by calculation.

The surfaces 31 and 32 may be made plane and be inclined 45° relative to the longitudinal axis of the element 5. Such surfaces are sufficient for workpieces of substantially equal diameters.

In order to maintain contact between the elements 6 and 7 and the surfaces 32 and 31, respectively, when the movement of the lever 14 is reversed compression springs 27 may be arranged between the housing 4 and the elements 6 and 7 for pressing the rolls 29 and 30 mounted on the elements 6 and 7 against the surfaces 32 and 31. The same result may be obtained by connecting the upper ends of the elements 6 and 7 to the element 5 by means of tension springs 28. As positive connection of the elements 6 and 7 to the element 5 is effected in one direction of movement only, noncircular portions of the workpiece 3 are easily taken care of without shifting the lever 14.

As considerable forces are transmitted and exerted through the elements 6 and 7 when clamping the workpiece 3 and when the cross section of the latter is not circular, bearing surfaces 33 and 34 are provided in the housing 4. These bearing surfaces 33, 34 are circular and concentric with respect to the pins 11 and 12. Corresponding surfaces are provided on the levers 6 and 7 and rest on the surfaces 33 and 34 for supplemental support of the elements 6 and 7.

In the embodiment of the invention shown in FIG. 1a the chuck 201 for clamping a workpiece 203 comprises a support 202 shown in broken lines for mounting a housing 204 on a turning machine, not shown. Jaw elements 205, 206, 207 are mounted on the housing 204. The element 205 is oblong and axially movable toward and from the workpiece 203. The elements 206 and 207 are in the form of two-armed levers fulcrumed to the housing 204 by pins 208 and 209, respectively. For positive interconnection of the elements 205, 206 and 207, the element 205 has a generally prismatic portion 210 provided with curved surfaces 211, 211' engaged by one end of the lever elements 206, 207, respectively. The second ends of the lever elements 206, 207 are pressed against the workpiece 203 when the element 205 is moved towards the workpiece. Tension springs 215, 215' are connected to the element 205 and to the elements 206, 207 for urging the latter into engagement with the surfaces 211, 211'.

The housing 204 of the chuck 201 forms bearings for the elements 206 and 207, circular bearing surfaces 213 and 213' being provided at the openings of the housing through which the elements 206, 207 extend. The elements 206 and 207 are provided with surfaces 214, 214' corresponding to the surfaces 213, 213'. In this way not only great forces can be absorbed by the elements 206, 207 and their bearing pins 208, 209, but the interior of the housing is sealed off at any position of the elements 206, 207 so that entry of dust, chips, and the like is effectively prevented.

For actuating the chuck 201, a piston 217 is axially movably arranged on a cylinder 216 which is directly connected to the element 205. The latter is guided by suitable guide means 212 in the housing 204 for movement towards and from the workpiece. If a pressure fluid is supplied to the cylinder 216 through a conduit 218, the piston 217 and the jaw element 205 connected thereto are moved towards the workpiece. At the same time the jaw elements 206 and 207 are moved for engagement of their outer ends with the workpiece by the action of the portion 210 of the element 205 so that the workpiece is held by the three elements 205, 206 and 207.

Figure 2:
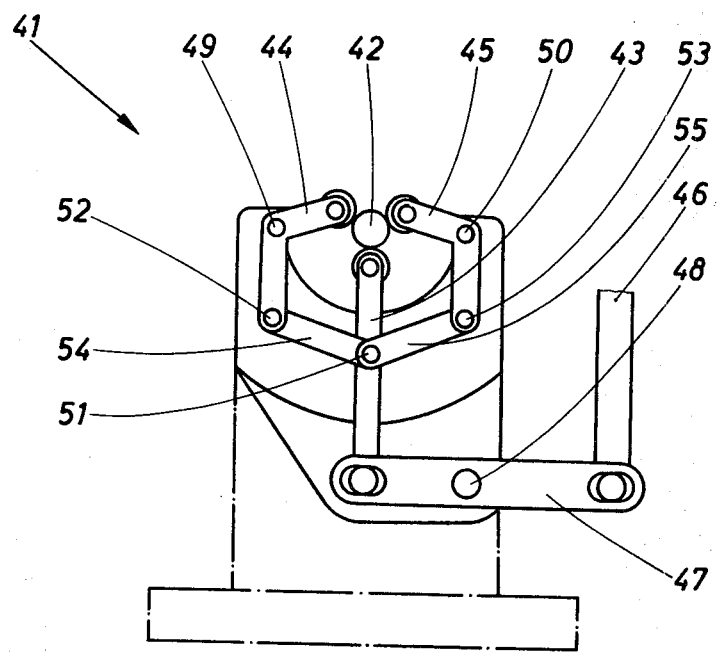
FIG. 2 is a schematic view of another modification of a chuck according to the invention.

In the modification shown in FIG. 2, jaw elements 43, 44 and 45 of a chuck 41 act on a workpiece 42 and are interconnected by links 54 and 55 which serve as shifting means. One end of a two-armed lever 47 rotatable around a pin 48 is pivoted to the element 43. The second end of the lever 47 is pivotably connected to an actuating rod 46. The jaw elements 44 and 45 are in the form of angle levers rotatable around pins 49 and 50, respectively. The jaw elements 44 and 45 are shifted according to the movement of the element 43 since they are connected thereto by the links 54, 55 which are pivoted to the element 43 at 51, and individually pivotably connected at 52 and 53 to the elements 44 and 45.

Figure 3:
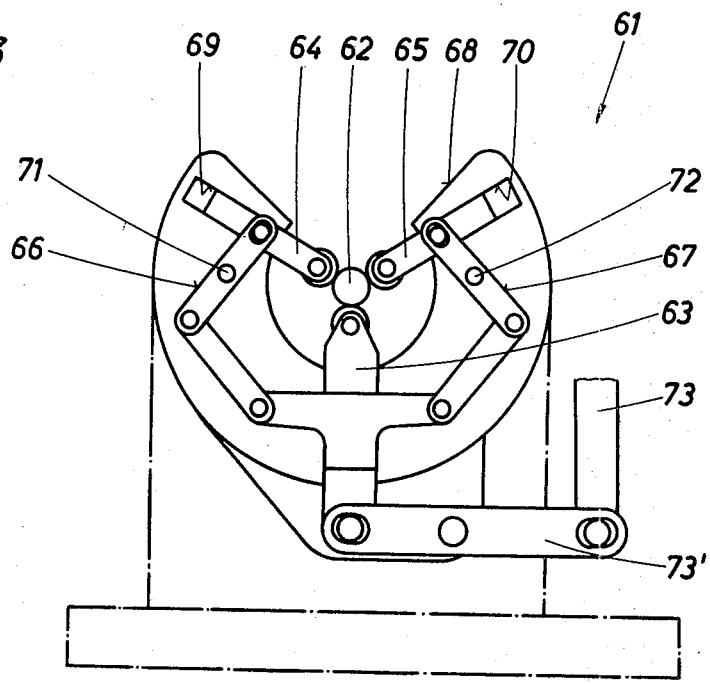
FIG. 3 is a schematic view of a further modification of a chuck according to the invention.

In the embodiment of the invention shown in FIG. 3, the chuck 61 comprises two two-armed levers 66 and 67 which turn on pins 71 and 72, respectively. One end of the lever 66 is pivoted to an oblong jaw element 64 and one end of the lever 67 is pivoted to an oblong jaw element 65. The second ends of the levers 66 and 67 are linked to an oblong jaw element 63. The elements 63, 64 and 65 act on a workpiece 62. The elements 64 and 65 are guided in recesses 69 and 70, respectively, in the housing 68 of the chuck, for guiding the elements 64 and 65 to move on straight lines radially with respect to the workpiece 62 when the jaw element 63 is moved towards or from the workpiece by an actuating mechanism; that actuating mechanism comprises an actuating rod 73 and a two-armed lever 73'.

In the modifications shown in FIGS. 2 and 3 the elements 43 and 63, respectively, are guided to move on straight lines towards and from the workpiece.

Figure 4:
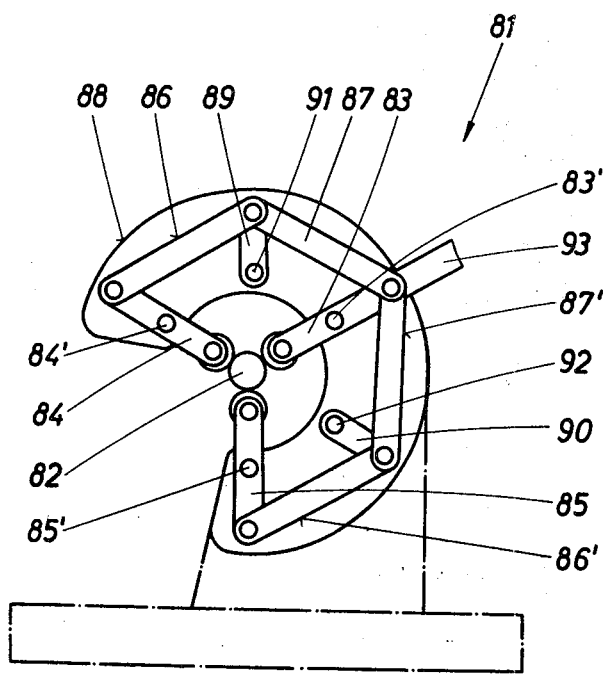
FIG. 4 is a schematic view of a fifth modification of a chuck according to the invention.

In the embodiment of the invention shown in FIG. 4, jaw elements 83, 84 and 85 of a chuck 81 are formed by two-armed levers turning on fulcrums 83', 84' and 85'. One end of each lever presses against a workpiece 82. The second ends of the levers 84 and 85 are linked by links 86 and 86' to arms 89 and 90, which turn on pins 91 and 92, respectively. The jaw element 83 is linked to the arms 89 and 90 by links 87 and 87', respectively. Pins 83', 84', 85', 91 and 92 are made fast on a housing 88 of the chuck 81. Turning of the element 83 around the pin 83' by applying a force to an extension 93 of the element 83 causes a corresponding movement of elements 83, 84 and 85 towards or from the workpiece 82.

Figure 5:
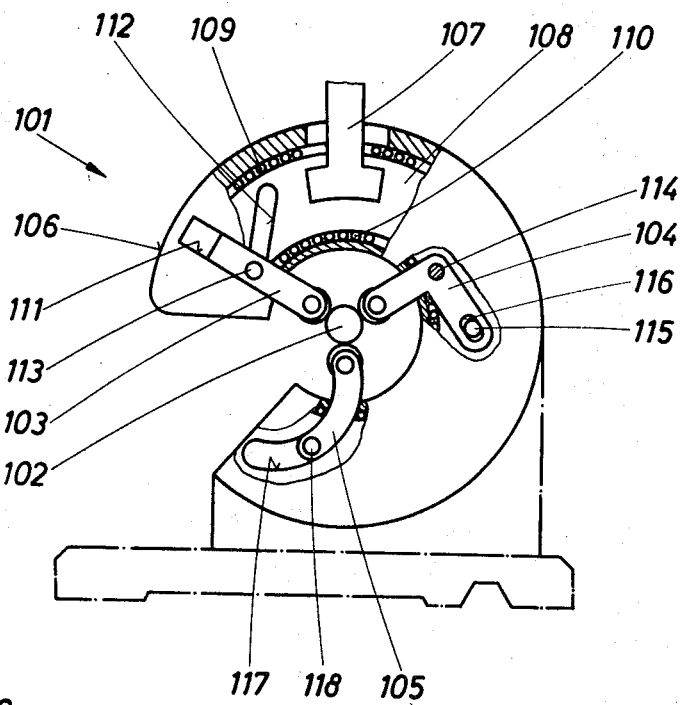
FIG. 5 is a schematic view of a sixth modification of a chuck according to the invention, with parts broken away.

In the modified chuck 101 illustrated in FIG. 5, an annular disc or member 108 is rotatably supported in a housing 106, and rollers 109 and 110 are provided for reducing friction. An actuating member 107 is connected to the member 108 for turning the latter for shifting differently shaped jaw elements 103, 104 and 105. The element 103, which is in the shape of a straight rod, is guided in a suitable recess 111 in the housing 106 for movement towards and from a workpiece 102 radially of the latter. For effecting such movement, a slot 112 is provided in the annular member 108 and a pin 113, slidable in the slot 112, is connected to the element 103. The element 104 is in the shape of an angle lever which turns on a pin 114 that is mounted on the housing 106. The end of one arm of the lever 104 is provided with an oblong hole 116 that receives a pin 115 which is mounted on the member 108. The element 105 is curved and provided at one end with a pin 118 that extends in a curved slot 117 in the member 108. Turning of the member 108 causes movement of the elements 103, 104 and 105 towards and from the workpiece 102.

Figure 6:
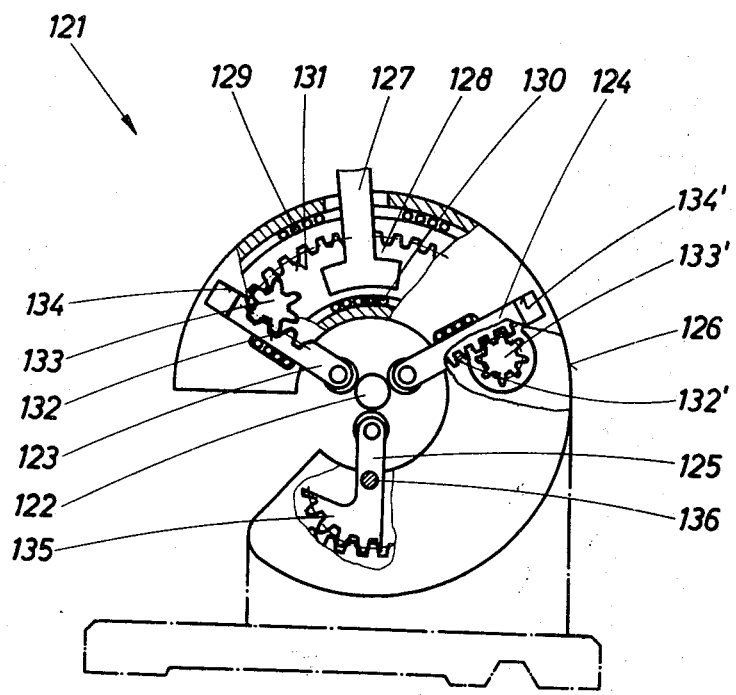
FIG. 6 is a schematic view of a seventh modification of a chuck with parts broken away, according to the invention.

For shifting the jaw elements 123, 124 and 125 of the chuck shown in FIG. 6, towards and from a workpiece 122, an annular member 128 is rotatable in a housing 126 and provided with an actuating arm 127 and a gear rim 131. The latter cooperates with pinions 133 and 133' which are rotatably mounted in the housing 126 and cooperate with racks 132 and 132', respectively, that form parts of the elements 123 and 124. The latter are guided in suitable recesses 134 and 134' in the housing 126, for movement towards and from the workpiece 122. The jaw element 125 turns on a pin 136 that is mounted in the housing 126 and is provided with a toothed segment 135 cooperating with the gear rim 131. The elements 123, 124 and 125 have ends adapted to engage the workpiece 122 and are moved towards and from the workpiece when the annular member 128 is rotated by actuation of the arm 127.

Figure 7:
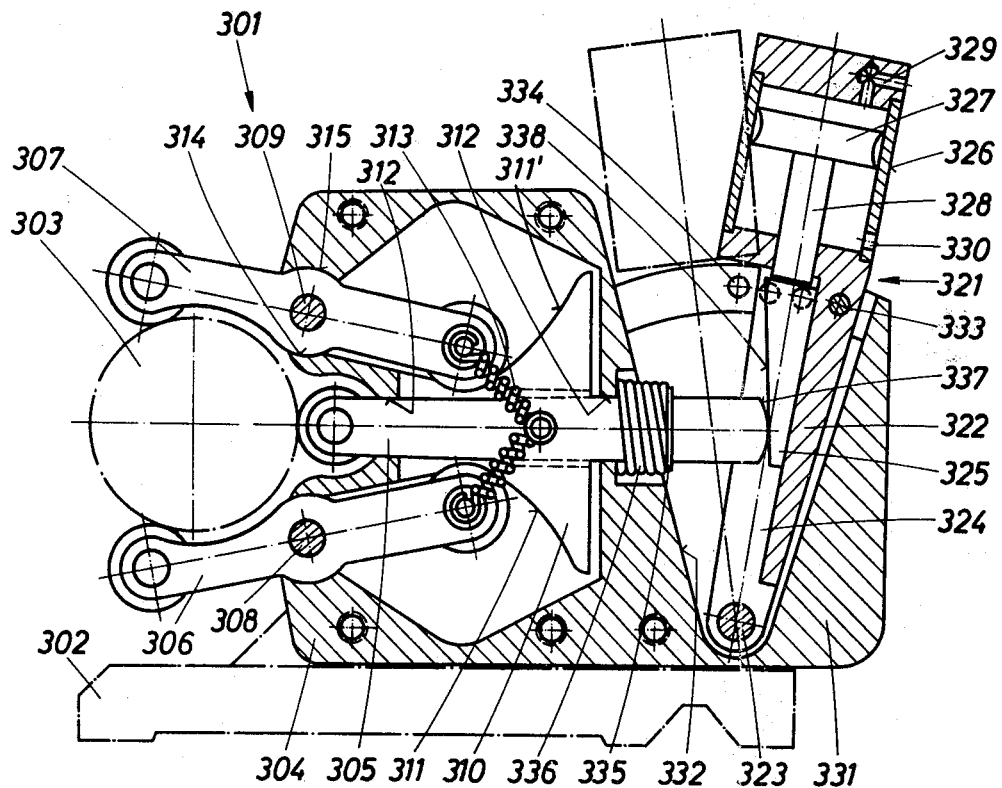
FIG. 7 is a schematic part sectional view of a chuck according to the invention of the type shown in FIG. 1a with operating power amplifying means combined therewith.

The chuck 301 shown in FIG. 7 substantially corresponds to the chuck shown in FIGS. 1 and 1a and comprises a support 302 for a housing 304 wherein operatively connected jaw elements 305, 306, and 307 are mounted for acting on a workpiece 303. The element 305 is oblong and guided in guides 312 in the housing 304 for movement towards and from the workpiece radially of the latter. The elements 306 and 307 are in the form of two-armed levers turnable on pins 308 and 309 that are mounted in the housing 304. For positive operative interconnection of the jaw elements 305, 306 and 307, the element 305 is provided with a cam portion 310 of generally prismatic configuration that has concave surfaces 311 and 311' against which abut one of the ends of the elements 306 and 307, respectively. Movement of the element 305 with the portion 310 towards and from the workpiece causes turning of the elements 306 and 307 around the pins 308 and 309. For maintaining engagement of the elements 306 and 307 with the portion 310, tension springs 313 are provided which connect the elements 306 and 307 to the element 305.

Bearings 314 are arranged in the housing 304 for the elements 306 and 307 at the openings of the housing through which the elements 306 and 307 extend. The bearing surfaces are circular and correspond to circular surfaces 315 of the elements 306 and 307. With this arrangement not only considerable forces can be applied to the elements 306 and 307 and their fulcrums 308 and 309, but also sealing of the interior of the housing 304 from the outside is assured at any position of the elements 306 and 307 so that entrance of turnings, chips and the like is prevented.

In order to produce the large clamping forces required for handling large workpieces, the chuck 301 is provided with an amplifying device 321 for reliably amplifying the force acting on the element 305. The amplifying device 321 comprises an arm 322 that is placed in a recess 332 of a housing extension 331 and is turnable around a pin 323 which is mounted in the extension 331. A wedge 325 that is slidable in a recess 324 of the arm 322 has a wedge surface 338 in engagement with a curved end-surface 337 of the element 305. The wedge 325 is connected to a piston rod 328 of a piston 327 in a cylinder 326.

When a pressure fluid is admitted to the cylinder 326, for example, through a conduit 329 while pressure fluid is released from the cylinder through an outlet 330, the wedge 325 is moved downward. The wedge surface 338 moves the element 305 towards the workpiece 303 according to the inclination of the wedge 325. The displacement of the piston 327 and the force exerted thereby is changed and the holding force of the elements 305, 306 and 307 is considerably increased whereas the displacement of the jaw elements is considerably decreased, depending on the inclination of the wedge.

The wedge 325 which rests on and is guided by the lever 322 affords amplification of the pressure acting on the workpiece 303 to almost any degree. When applying or releasing the chuck 301, the jaw elements 305, 306 and 307 are shifted within a limited range so that the time required for applying and releasing the chuck is extremely short and the piston 327 may always be fully loaded. The surface 337 of the element 305 continuously abuts against the wedge surface 338, also when the chuck is released, because a spring 336 that is placed between the housing 304 and a collar on the element 305 urges the latter to move towards the wedge 325.

To compensate the considerable reduction of the stroke of the element 305 caused by the wedge 325, the latter is slidably arranged on the lever 322 turning on the fulcrum 323 so that the chuck 301 can be used for workpieces of great diameter. As shown in broken lines, the position of the wedge 325 and of the cylinder 326 can be so changed that the wedge is correlated with a different diameter range of the workpiece. To accomplish this, a bolt 333 connecting the lever 322 to the housing extension 331 must be removed and the lever 322 must be turned according to the diameter of the workpiece. The jaw elements 305, 306, 307 are thereby also shifted. By inserting the bolt 333 into one of bores 334 provided in the housing extension 331, the lever 322 and with it the wedge 325 may be fixed in a predetermined position corresponding to the diameter of the workpiece.

Figure 8:
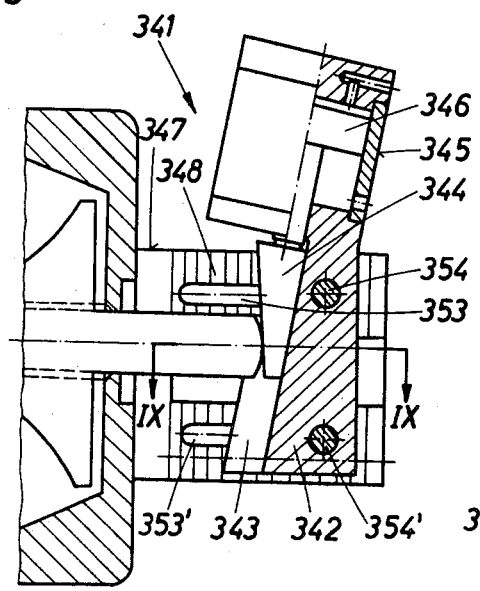
FIG. 8 is a sectional view of parts of a chuck provided with modified power amplifying means.
Figure 9:
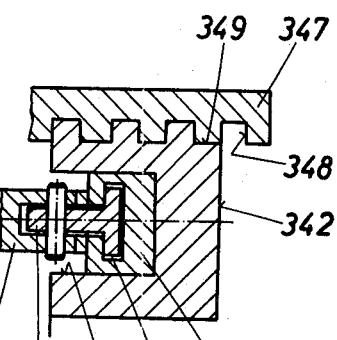
FIG. 9 is a sectional view taken along the line IX—IX of FIG. 8.

The amplifying mechanism 341 shown in FIGS. 8 and 9 comprises a post 342 that has a recess 343 wherein a wedge 344 is slidable. For moving the wedge 344, a pressure fluid actuated piston 346 is arranged in a cylinder and operatively connected to the wedge 344.

In order to move the wedge 344 towards and from the workpiece for adapting the device to different diameter ranges of the workpiece, a housing extension 347 is provided with teeth 348 mating with teeth 349 provided on the post 342. By withdrawing the bolts 354 and 354' from grooves 353 and 353' which prevent sliding of the teeth of the post 342 in the tooth gaps of the housing extension 347, the post 342 can be lifted and placed in a different position which is parallel to the previous position, whereby the distance of the wedge 344 from the workpiece is changed and the device is adapted to a different diameter range of the workpiece.

FIG. 9 shows means for connecting the jaw element 350 to the wedge 344, particularly for releasing the jaw element from the workpiece. The post 342 is provided with a groove 351 parallel with the surface of the post 342 whereon the wedge 344 slides. An intermediate member 352 is slidable in the groove 351 and movably connected to the jaw element 350. If the latter is shifted by the wedge 344 and if the wedge is returned to its starting position, the element 350 is also returned to its initial position.

The operation of the chucks of the invention follows from the disclosure of the individual embodiments.

The chuck according to the invention is characterized by a simple structure and sustained good operating conditions. As all jaw elements acting externally or internally on the workpiece are yieldable, noncircular portions are taken care of in a simple manner so that the workpiece is always centered. The proposed mechanisms permit quick clamping and releasing of the workpiece whereby shifting of the jaw elements can be effected automatically by means of a separate control in dependence on one or more operating conditions. The resulting saving of time is considerable relative to comparable conventional clamping devices. As the structure of the proposed chuck is simple, its size, particularly its width is relatively small so that it can be inexpensively manufactured and can be used without difficulty on all types of turning machines.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. An apparatus for clamping a workpiece in a turning machine, comprising three movable jaw elements capable of abutting engagement with the workpiece, one of said jaw elements having an oblong configuration and a workpiece engaging roller at one end, actuating means operatively connected to said one jaw element for moving said element along the lonigtudinal axis thereof towards and from the workpiece, the second and third jaw elements being in the form of two-armed levers, each lever having a roller at one end capable of engaging the workpiece, and shifting means connected to the first of said jaw elements, each of said levers having a second end operatively connected to said shifting means, said two-armed levers being in the form of angle levers and placed symmetrically relative to the longitudinal axis of said one jaw element, wherein said shifting means is in the form of a prism having curved surfaces inclined relative to the longitudinal axis of said first jaw element, the second ends of said levers individually abutting said curved surfaces, said curved surfaces being formed with a curvature for imparting a simultaneous movement of the workpiece engaging ends of said second and third jaw elements so that the points of contact each move along a straight line originating at the center of the workpiece being clamped, while said first jaw element undergoing similar radial movement.

2. An apparatus according to claim 1, comprising resilient means operatively connected to said levers and to said first jaw element for maintaining operative connection of said second ends of said levers with said shifting means.

3. An apparatus according to claim 1, comprising a housing, resilient means interposed between said levers and said housing for maintaining operative connection of said second ends of said levers with said shifting means.

4. An apparatus according to claim 1, comprising a housing, fulcrums in said housing for said levers, cylindrical bearing surfaces in said housing concentric with respect to said fulcrums, and said levers having surfaces corresponding to said cylindrical bearing surfaces and in sliding engagement therewith for supplementally supporting said levers.

5. An apparatus as defined in claim 1, comprising power transmitting and amplifying means connected to said actuating means and to one of said jaw elements, for transmitting and amplfying power from said actuating means to said jaw elements.

6. An apparatus as defined in claim 1, wherein one of said jaw elements is oblong and movable along the longitudinal axis thereof towards and from the workpiece, power transmitting and amplfying means being operatively connected to said actuating means and to said oblong jaw element, for transmitting and amplifying power from said actuating means to said oblong jaw element.

References Cited

UNITED STATES PATENTS

| 1,961,091 | 5/1934 | Smith et al. | 82—38 |
| 2,160,378 | 5/1939 | Balsiger | 51—238 |
| 3,234,829 | 2/1966 | Dinsmore | 82—39 |
| 3,330,074 | 7/1967 | Stuckey | 51—238 |

LEONIDAS VLACHOS, Primary Examiner